(12) United States Patent
Douglas et al.

(10) Patent No.: US 10,776,773 B2
(45) Date of Patent: Sep. 15, 2020

(54) SYSTEMS AND METHODS FOR PROVIDING TRANSACTION TOKENS FOR MOBILE DEVICES

(71) Applicant: Capital One Services, LLC, McLean, VA (US)

(72) Inventors: Lawrence Douglas, McLean, VA (US); Luke A. Hammock, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/190,995

(22) Filed: Nov. 14, 2018

(65) Prior Publication Data

US 2019/0080316 A1 Mar. 14, 2019

Related U.S. Application Data

(63) Continuation of application No. 15/880,519, filed on Jan. 25, 2018, now Pat. No. 10,163,096, which is a continuation of application No. 14/605,713, filed on Jan. 26, 2015, now Pat. No. 9,922,318.

(60) Provisional application No. 61/931,888, filed on Jan. 27, 2014.

(51) Int. Cl.
  *G06Q 20/32* (2012.01)
  *G06Q 20/38* (2012.01)
  *G06Q 20/42* (2012.01)
  *G06Q 20/36* (2012.01)

(52) U.S. Cl.
  CPC ....... *G06Q 20/3278* (2013.01); *G06Q 20/322* (2013.01); *G06Q 20/3276* (2013.01); *G06Q 20/3821* (2013.01); *G06Q 20/425* (2013.01); *G06Q 20/367* (2013.01); *G06Q 20/3674* (2013.01); *G06Q 2220/00* (2013.01)

(58) Field of Classification Search
  CPC .................. G06Q 20/3278; G06Q 20/3674
  See application file for complete search history.

(56) References Cited

U.S. PATENT DOCUMENTS

| | | |
|---|---|---|
| 2009/0300738 A1 | 12/2009 | Dewe et al. |
| 2012/0150687 A1 | 6/2012 | Hart |
| 2012/0233005 A1 | 9/2012 | White |
| 2012/0303438 A1 | 11/2012 | Futty et al. |
| 2013/0001298 A1 | 1/2013 | Reblin |

(Continued)

*Primary Examiner* — A. Hunter Wilder
(74) *Attorney, Agent, or Firm* — Finnegan, Henderson, Farabow, Garrett & Dunner, LLP

(57) ABSTRACT

The disclosed embodiments include methods and systems for providing payment token transactions by a mobile device. The mobile device may be operable to obtain a payment token, where the payment token is associated with one or more payment token parameters and the mobile device may be configured to communicate with a financial service provider system over a first network when connectivity to the first network is available to the mobile device. The mobile device may provide the payment token to a contactless payment terminal (CPT) associated with a merchant, during a purchase transaction involving a product provided by the merchant, where the mobile device may communicate the payment token to the CPT over a local network that is different from the first network such that connectivity between the mobile device and the first network is not required.

18 Claims, 6 Drawing Sheets

(56) References Cited

U.S. PATENT DOCUMENTS

| | | |
|---|---|---|
| 2013/0048714 A1 | 2/2013 | Sharma et al. |
| 2013/0282590 A1* | 10/2013 | Rajarethnam ...... G06Q 20/3276 |
| | | 705/71 |
| 2013/0290089 A1 | 10/2013 | Bousbib et al. |
| 2013/0339188 A1* | 12/2013 | Mohamed ............ G06Q 20/027 |
| | | 705/26.41 |
| 2015/0120472 A1 | 4/2015 | Aabye et al. |
| 2016/0117660 A1 | 4/2016 | Prakash et al. |

\* cited by examiner

SYSTEMS AND METHODS FOR PROVIDING TRANSACTION TOKENS FOR MOBILE DEVICES

CROSS-REFERENCE TO RELATED APPLICATIONS

This application is a continuation of U.S. patent application Ser. No. 15/880,519, filed on Jan. 25, 2018, which is a continuation of U.S. patent application Ser. No. 14/605,713, filed on Jan. 26, 2015, now U.S. Pat. No. 9,922,318, which is entitled to and claims the benefit of priority from U.S. Provisional Application No. 61/931,888 filed Jan. 27, 2014. The disclosures of the above-referenced applications are expressly incorporated herein by reference in their entireties.

TECHNICAL FIELD

The disclosed embodiments generally relate to transaction processing and, in particular, to methods and systems for handling transactions associated with payment tokens.

BACKGROUND

Many forms of mobile payments are available to consumers today. While traditional methods such as cash and credit cards remain popular, many consumers also use new forms of payment made available via electronic computing devices. For example, many devices contain near-field communication ("NFC") capability, which allows a payment to be initiated when the device is placed into close proximity with an NFC reader. The payment terminal obtains payment account information through the NFC reader and then communicates with an appropriate financial network or other back-end processing system to authorize the transaction.

Payment tokens are considered as a secure use of stored value for mobile devices being equipped with NFC technology to conduct payment transactions with contactless payment cards, contactless payment terminals, and/or other NFC equipped cell phones. However, unlike payments by a physical card or cash, network connectivity is required for mobile devices to request and/or receive payment tokens for mobile payment transactions and for authorizing the transactions. For example, a mobile device needs to connect to a server of a financial service provider, such as a bank, to download a digital asset prior to making an in-store purchase through contactless payment terminals. Also, merchant systems may require network connectivity to process and receive authorization for a purchase transaction performed with a mobile device and a financial account. Certain aspects of the disclosed embodiments provide methods and systems that enable the authorization and processing of transactions with payment tokens without network connectivity to a backend system, such as a financial service provider, payment network, and the like. Other aspects are also provided as disclosed below.

SUMMARY

Disclosed embodiments include methods and mobile devices configured to, for example, provide payment token transactions. The method and mobile device may obtain, by one or more processors of the mobile device, a payment token, the payment token associated with one or more payment token parameters and the mobile device configured to communicate with a financial service provider system over a first network when connectivity to the first network is available to the mobile device, wherein the financial service provider system is associated with a financial service provider that provides a financial service account to a user of the mobile device, store the payment token in a memory of the mobile device, provide, by the one or more processors, the payment token to a contactless payment terminal (CPT) associated with a merchant, during a purchase transaction involving a product provided by the merchant, the providing involving communicating the payment token to the CPT over a local network that is different from the first network such that connectivity between the mobile device and the first network is not required, and receive an indication from the CPT that the purchase transaction involving the payment token is authorized, such that the payment token is used to cover some or all of a purchase amount for the product. Obtaining the payment token may include obtaining the payment token when the mobile device does not have network connectivity with the first network. Obtaining the payment token may also include receiving, by the one or more processors, information from a barcode including the payment token. The barcode may be a Quick Response (QR) Code. The method and mobile device may further decode, by the one or more processors, the barcode to obtain the payment token. The payment token may be one of: affixed to a product package associated with a product offered for sale by a merchant associated with the CPT, printed in paper format in a printed document, or affixed to signage. The payment token may include information associating the payment token to an account of a user operating the mobile device. The payment token may be associated with one or more stock keeping unit (SKU) numbers. The payment token may be associated with an expiration date of the payment token transactions. In addition, the payment token may be refreshed when connectivity between the mobile device and the first network is available.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed. For example, the methods relating to the disclosed embodiments may be implemented in system environments outside of the exemplary system environments disclosed herein.

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
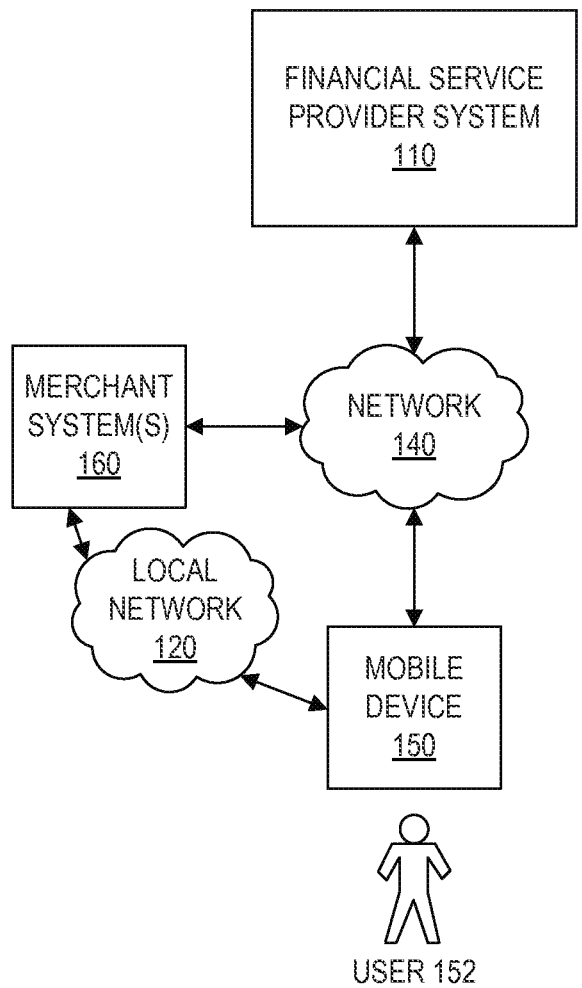
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service provider systems 110, one or more mobile devices 150, one or more merchant systems 160, network 140, and local network 120. The components and arrangement of the components included in system 100 may vary. Thus, system 100 may include other components that perform or assist in the performance of one or more processes consistent with the disclosed embodiments.

Systems 110, 150, and/or 160 may be computing systems configured to initiate a payment and perform financial transactions, consistent with disclosed embodiments. Systems 110, 150, and/or 160 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored on one or more memory devices to perform one or more operations consistent with the disclosed embodiments. Systems 110, 150, and/or 160 may be configured to communicate with one or more other components of system 100. In certain aspects, one or more users may operate one or more components of systems 110, 150, and/or 160 to initiate one or more operations consistent with the disclosed embodiments.

Financial service provider system(s) 110 may be a system associated with a financial service provider, which may be an entity providing financial services. For example, financial service provider system 110 may be associated with a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, and the like. Financial service provider system 110 may also include infrastructure and components that are configured to generate and/or provide financial service accounts associated with electronic accounts, such as a digital wallet or similar account that may be used to perform electronic transactions, such as purchasing goods and/or services online.

The financial service provider system 110 may also include infrastructures and components that are configured to manage transactions associated with a customer financial service account. In certain aspects, financial service provider system 110 may include one or more computing devices configured to communicate with mobile device 150 and merchant system 160 to perform processes associated with a payment token. For example, financial service provider system 110 may include one or more computing devices configured to generate one or more payment tokens, authorize transactions, and settle accounts, as will be described in more detail below. In one embodiment, a payment token may be a data element that is associated with an account, such as for example, a financial service account, associated with one or more users. In certain aspects, a payment token may include information and function in some ways similar to known tokens used for payment card purposes as known to those skilled in the art. In certain embodiments, payment tokens consistent with certain disclosed embodiments may be configured to provide additional information that may be used by one or more systems to perform one or more operations consistent with disclosed embodiments. Payment tokens consistent with the disclosed embodiments may be formatted in various ways. For example, a payment token may match the format of original sensitive data. As an example, the disclosed embodiments may format a payment token such that it has a data length the same as a financial account parameter, such as a primary account number (e.g., bank card number). In other aspects, a payment token may include authorization data that may be used to authorize transactions involving a financial account associated with the payment token. In certain embodiments, payment tokens may be configured in such a way that they can be used for payment transactions for certain merchant(s), with certain digital wallet(s), certain mobile device(s), for certain user(s), in certain location(s), for certain product(s) or service(s) (e.g., linked to certain SKUs, etc.), with certain temporal restrictions (e.g., available for use for certain time periods, refreshable, nonrefreshable, etc.) and the like. The disclosed embodiments may execute software instructions that perform processes for generating, storing, processing, decoding, coding, transmitting, and/or receiving payment token(s) in certain formats with certain characteristics (e.g., associated with certain user(s), time restrictions, product restrictions, merchant restrictions, etc.).

In certain aspects, a financial service provider associated with financial service provider system 110 may be (or include a service corresponding to that of) a bank, a credit card company, or the like. The financial service provider may maintain financial service accounts for customers, such as checking and savings accounts, in a manner known in the art. The financial service provider may or may not be associated with physical branch locations at which the customers may make transactions, such as financial deposits or withdrawals, that may be typically associated with a bank or similar financial service provider. Financial service system 110 may be configured to perform operations associated with the management of financial service accounts and may allow one or more users (e.g., customers) to participate in account management operations remotely, such as via network 140.

Mobile device(s) 150 may be one or more computing devices configured to perform one or more operations consistent with disclosed embodiments. Mobile device 150 may be a mobile computer-based system, such as, for example, cellular telephone, tablets, hand held computing devices (e.g., smart phones), tablets, laptops, and any other type of mobile computer-based system. For example, mobile device 150 could be an Apple iPhone®, iPod® or iPad®, or any other mobile device running Apple's iOS operating system, any device running Google's Android® operating system, any music player, any device running Microsoft's Windows® Mobile operating system, and/or any other smartphone or like device.

Mobile device(s) 150 may include one or more processors configured to execute software instructions stored in memory, such as memory included in mobile device 150. Mobile device 150 may include software that when executed by a processor performs near field communication (NFC) contactless payment processes and content display processes. For instance, mobile device 150 may execute software that generates and displays interfaces that enables user control for NFC transmission of payment data via, for example network 120. In some embodiments, mobile device 150 may be configured to execute software that enables the mobile device to scan, read, decode, and/or, decrypt product information located on a product, signage, or any other type of material or thing that may include such product information. In one embodiment, the product information may be in the form of a one-dimension or two-dimensional barcode. In other embodiments, product information may be another form of product label (e.g., UPC, SKU, etc.) that is affixed to a product, signage, or other material or thing. Product information may also be in electronic form, such as a barcode or other label displayed on a display device. In certain aspects, product information may include information reflecting a product, such as a product description, sales price, or other characteristics of the product. In another embodiment, product information may also be a payment token. In other embodiments, product information include information reflecting a product and a payment token.

In certain embodiments, mobile device 150 may be configured to execute instructions that perform payment token processes. For example, mobile device 150 may be configured to obtain a payment token from a payment token host, such as a product, signage, and the like. In one embodiment, mobile device 150 may be configured to scan, read, decode, and/or, decrypt product information to obtain a payment token. In other embodiments, mobile device 150 may be configured to scan, read, decode, and/or decrypt a payment token from a payment token host (e.g., a label on a product, signage, or other display or type of host). Mobile device 150 may be configured to store the payment token and/or product information in one or more memories.

The disclosed embodiments are not limited to any particular configuration of mobile device 150. For instance, mobile device 150 may be configured to obtain, store, and execute one or more mobile applications that provide financial service related functions, such as functions offered by financial service provider system 110 and/or merchant system 160. For example, mobile device 150 may store and execute a mobile banking application that enable a user operating mobile device 150 (e.g., user 152) to check balances, pay bills, or for perform financial transactions, such as mobile payments with a point of sale (POS) or similar system, etc. In certain embodiments, mobile device 150 may be configured to execute software instructions relating to location services, such as GPS locations. For example, mobile device 150 may be configured to determine a geographic location of mobile device 150 (and associated user 152) and provide location data and time stamp data corresponding to the location data.

In one embodiment, a user 152 may use mobile device 150 to perform one or more operations consistent with the disclosed embodiments. In one aspect, user 152 may be a customer of a financial service provider that provides financial service accounts, such as a financial service provider associated with financial service provider system 110. For instance, a financial service provider may maintain a financial service account (e.g., credit card account) for user 152 that user 152 may use to purchase goods and/or services online or at brick-and-mortar locations associated with a merchant relating to merchant system 160. In other embodiments, user 152 may be a potential customer of a financial service provider associated with financial service provider 110 or may not be affiliated with such a financial service provider from the user's perspective and/or the financial service provider's perspective.

In certain aspects, mobile device 150 may be a computing device that stores and executes applications and/or communication software that allows mobile device 150 to communicate with contactless payment terminals (CPTs) to conduct payment transactions. Contactless payment terminal may be point of sale terminal, automated teller machine, signage, RFID or similar tag mounted on any type of equipment, product, person, and the like, or any other device that is configured to communicate with NFC mobile devices that are known in the art. Mobile device 150 may also execute applications and/or communication software to perform financial transaction processes, including payment methods, such as NFC, optical payment methods such as QR codes, audio-based payment methods, internet-based payment methods, SMS payment methods, or other payment methods known in the art. The disclosed embodiments are not limited to any particular configuration of mobile device 150.

Merchant system 160 may be one or more computing systems associated with a merchant, which may be an entity that provides goods, services, and/or information, such as a retailer, grocery store, service provider (e.g., utility company, etc.), non-profit organization or any other type of entity that provides goods, services, and/or information that consumers (e.g., end-users or other business entities, such as user 152) may purchase, consume, use, etc. Merchant system 160 is not limited to systems associated with merchant(s) that conduct business in any particular industry or field.

Merchant system 160 may be associated with a merchant brick-and-mortar location(s) that a consumer (e.g., user 152) physically visits to purchase goods and services. Such physical locations may include merchant system 160, which may include computing devices that perform financial service transactions with consumers (e.g., Point of Sale (POS) terminal(s), kiosks, contactless payment terminals (CPTs), etc.). In other embodiments, merchant system 160 may be located remotely from a merchant location. Merchant system 160 may also include back-end/or front-end computing components that store data and execute software instructions to perform operations consistent with disclosed embodiments, such as computers that are operated by employees of the merchant (e.g., back office systems, etc.). Merchant system 160 may also be associated with a merchant that provides goods and/or services via known online or e-commerce type of solutions. For example, such a merchant may sell goods via a website using known online or e-commerce systems and solutions to market, sell, and process online transactions. Merchant system 160 may include one or more computing systems, such as server(s), that are configured to execute stored software instructions to perform operations associated with a merchant, including one or more processes associated with processing purchase transactions, generating transaction data, generating product data (e.g., SKU data) relating to purchase transactions, etc.

Network 140 may be any type of network configured to provide communications between components of system 100. For example, network 140 may be any type of network (including infrastructure) that provides communications, exchanges information, and/or facilitates the exchange of information, such as the Internet, a Local Area Network, NFC, Optical code scanner, or other suitable connection(s)

that enables the sending and receiving of information between the components of system 100. In other embodiments, one or more components of system 100 may communicate directly through a dedicated communication link(s), such as links between financial service provider system 110, mobile devices 150, and merchant systems 160.

Local network 120 may be any type of network or similar communication link configured to provide communications between mobile device 150 and merchant system 160. For example, local network 120 may be any type of network (including infrastructure) that provides communications, exchanges information, and/or facilitates the exchange of information, such as a NFC or other suitable connection(s) that enables the sending and receiving of information between mobile device 150 and merchant system 160. For instance, mobile device 150 may exchange information with a POS or similar CPT included in merchant system 160 to perform transactions (e.g., purchase transactions).

Figure 2:
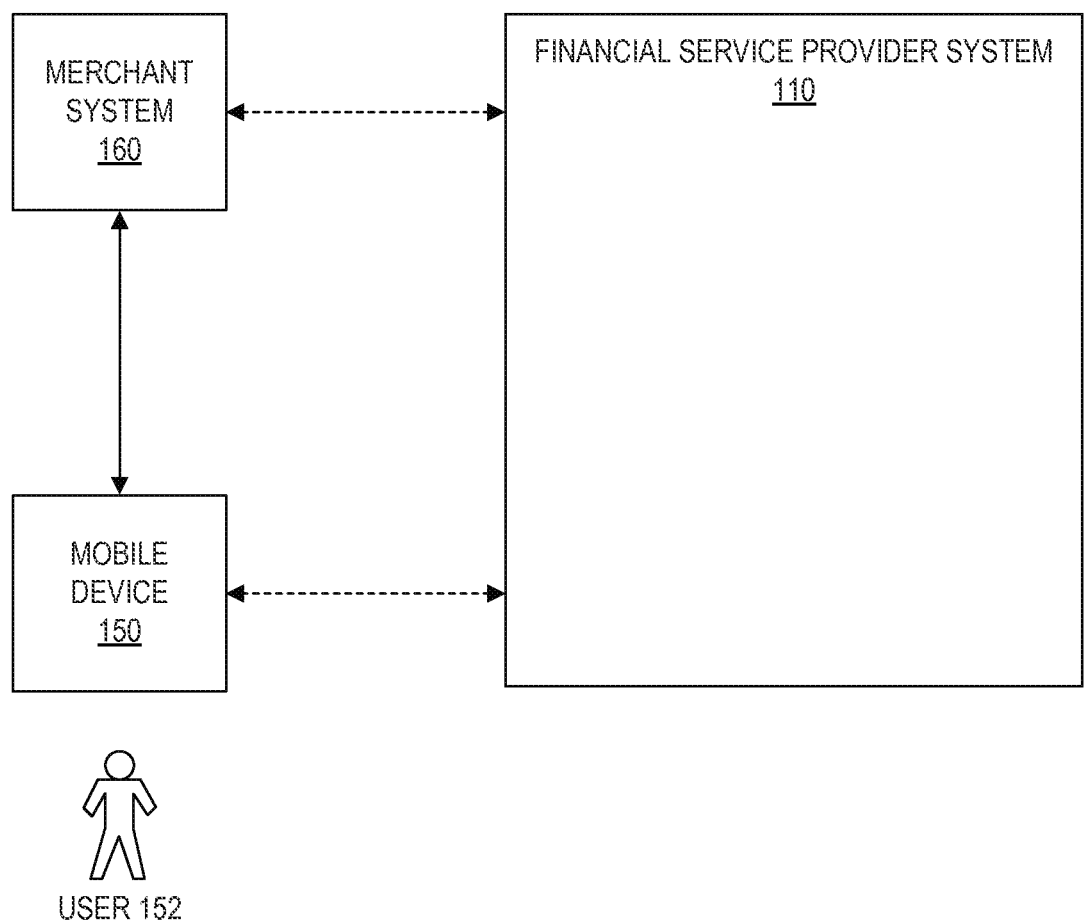
FIG. 2 is a block diagram of another exemplary system, consistent with disclosed embodiments.

FIG. 2 shows a block diagram of an exemplary arrangement 200 for performing a payment transaction with a mobile device 150, consistent with disclosed embodiments. In one embodiment, a user 152 may operate mobile device 150 to initiate a payment with a merchant system 160 in accordance with the disclosed embodiments. Mobile device 150 may communicate with merchant system 160 using known wireless communication protocols, such as NFC, to provide product information, payment tokens, etc. Mobile device 150 may use known payment processes to exchange information with merchant system 160, such as optical barcodes or QR code exchange processes, audio payment methods, SMS-based payment methods, or any other payment system or payment process known in the art. Mobile device 150 and/or merchant system 160 may be configured to communicate data regarding the payment transaction to financial service provider system 110 (if such communication network is available). Financial service provider system 110 may send information such as payment confirmation, failure notification, or a request for more information to merchant system 160 and/or mobile device 150.

It is to be understood that the configuration and boundaries of the functional components of systems 100 and 200 are not limiting to the disclosed embodiments. Alternative configurations and boundaries may be implemented to perform one or more operations and processes consistent with the disclosed embodiments. For example, mobile device 150 and merchant system 160 may constitute part of components of systems 100 and/or 200 other than those specifically described, or may constitute a part of multiple components of system 100 (e.g., a distributed system). Such alternatives fall within the scope and spirit of the disclosed embodiments.

Figure 3:
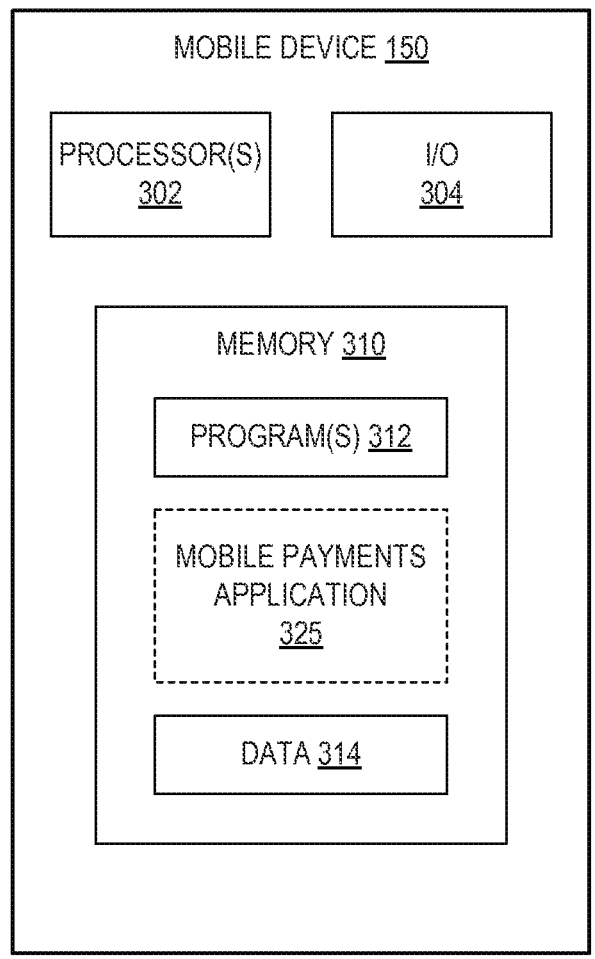
FIG. 3 is a block diagram of an exemplary mobile device, consistent with disclosed embodiments.

FIG. 3 shows an exemplary mobile device 150 consistent with disclosed embodiments. In one embodiment, mobile device 150 may include one or more processors 302, one or more input/output (I/O) devices 304, and one or more memories 310. In some embodiments, mobile device 150 may take the form of a mobile computing device such as a smartphone or tablet, a laptop, or any combination of these components. Alternatively, mobile device 150 (or a system including mobile device 150) may be configured as a particular apparatus, embedded system, dedicated circuit, and the like based on the storage, execution, and/or implementation of the software instructions that perform one or more operations consistent with the disclosed embodiments. According to some embodiments, mobile device 150 may comprise a camera that can be configured to capture an image of a barcode, information code, payment token (e.g., in code format, etc.). Mobile device 150 may also comprise software programs that may be configured to scan, read, decode, and/or decrypt the captured image of a barcode or other code (e.g., payment token), decode and process the obtained information from the captured image, and display the decoded information on a screen of mobile device 150 consistent with disclosed embodiments.

Processor 302 may include one or more known processing devices, such as mobile device microprocessors manufactured by Intel™, NVIDIA™, or any various other processors. The disclosed embodiments are not limited to any type of processor(s) configured in mobile device 150. Processor(s) 302 may include a single core or multiple core processor system that provides the ability to perform parallel processes simultaneously. For example, processor 302 may be a single core processor that is configured with virtual processing technologies known to those skilled in the art. In certain embodiments, processor 302 may use logical processors to simultaneously execute and control multiple processes. Processor 302 may implement virtual machine technologies, or other similar known technologies to provide the ability to execute, control, run, manipulate, store, etc. multiple software processes, applications, programs, etc. In another embodiment, processor(s) 302 may include a multiple-core processor arrangement (e.g., dual or quad core) that is configured to provide parallel processing functionalities to allow mobile device 150 to execute multiple processes simultaneously. One of ordinary skill in the art would understand that other types of processor arrangements could be implemented that provide for the capabilities disclosed herein.

Memory 310 may include one or more storage devices configured to store instructions used by processor 302 to perform functions related to disclosed embodiments. For example, memory 310 may be configured with one or more software instructions, such as program(s) 312 that may perform one or more operations when executed by processor 302. The disclosed embodiments are not limited to separate programs or computers configured to perform dedicated tasks. For example, memory 310 may include a single program 302 that performs the functions of the mobile device 150, or program 312 may comprise multiple programs. Memory 310 may also store data 314 that is used by one or more programs 312.

In certain embodiments, memory 310 may store a mobile payment application 325 that may be executed by processor(s) 302 to perform one or more mobile payment application processes consistent with disclosed embodiments. For example, mobile payment application 325 may be provided by a financial service provider system 110 or another system associated with a financial service provider that provides financial accounts held by user 152. In certain aspects, mobile payment application 325, or another software component, may be configured to perform detection processes for detecting certain positions and orientations of mobile device 150. For instance, these software instructions may, when executed by processor(s) 302, may processes information received from components within mobile device 150 that detect and provide signals indicating the orientation of mobile device 150, or whether certain motions or movements are performed on mobile device 150 (e.g., shaking, twisting, turning, flipping, moving at a certain accelerations or directions, etc.). The software instructions may process this information to determine whether certain conditions have been met in relation to certain mobile payment application functions, such as payment functions that may be deep linked into options of the mobile payment application.

I/O devices 304 may be one or more devices configured to allow data to be received and/or transmitted by mobile device 150. I/O devices 304 may include one or more digital and/or analog devices that allow mobile device 150 to communicate with other machines and devices, such as other components of systems 100 and 200. For example, I/O devices 304 may include a screen for displaying optical payment methods such as payment tokens, or providing information to the user. I/O devices 304 may also include components for NFC communication. I/O devices 304 may also include one or more digital and/or analog devices that allow user 152 to interact with mobile device 150 such as a touch-sensitive area, buttons, or microphones. I/O devices 304 may also include one or more accelerometers to detect the orientation and inertia of device 150. I/O devices 304 may also include other components known in the art for interacting with user 152, merchant system 160, or financial service provider system 110.

The components of mobile device 150 may be implemented in hardware, software, or a combination of both hardware and software, as will be apparent to those skilled in the art.

In certain aspects, mobile device 150 may execute software instructions that receive input from user 152 that may configure one or more software applications, such as mobile payment application 325. For another instance, in certain embodiments, mobile device 150 may be configured to execute software instructions that enable mobile device 150 to read, decode, and/or decrypt information, such as an external barcode, or other type of coded information. The software instructions that are configured to, when executed by one or more processors(s), scan, read, decode, and/or decrypt such information may be embedded within mobile payment application 325, deep linked within one or more levels of functionality within mobile payment application 325, or may be a standalone program separate from application 325. User 152 may configure mobile device 150, and/or mobile payment application 325, or another software component, to perform certain actions based on received input from the user, such as through detected input through a touch screen, keypad, movements, motions, gestures, and the like by mobile device 150.

Figure 4:
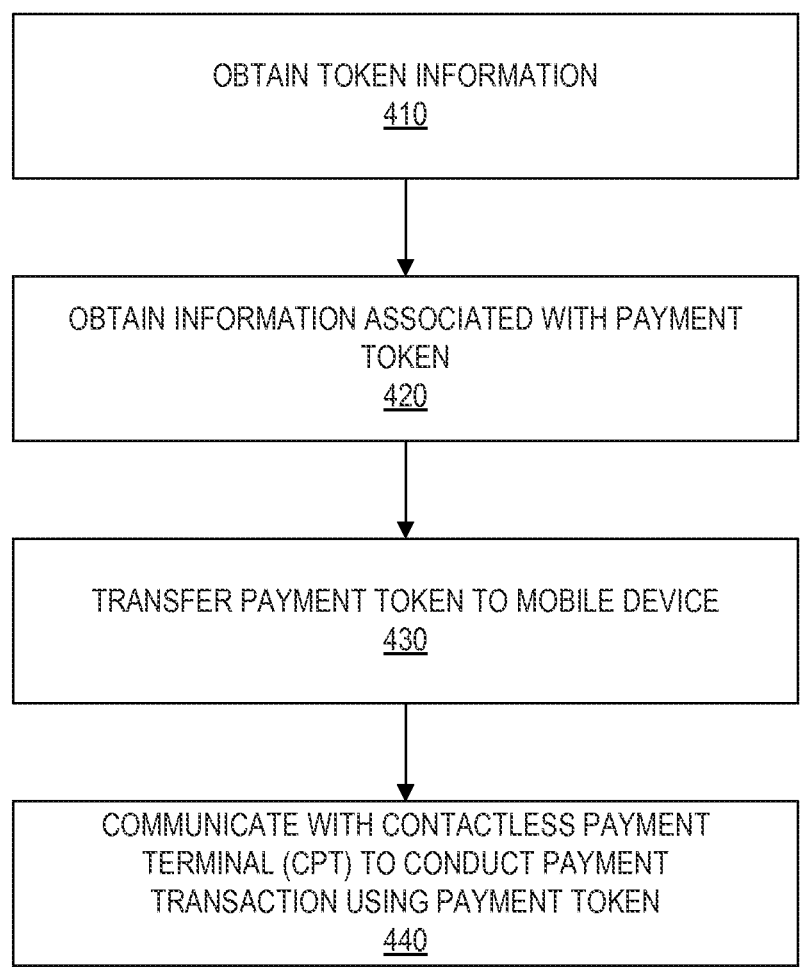
FIG. 4 is a flowchart of an exemplary mobile payment process, consistent with disclosed embodiments.

FIG. 4 shows a flowchart of an exemplary mobile payment process 400, consistent with disclosed embodiments. In step 410, mobile device 150 may obtain token information. Token information may include a payment token, product information (e.g., SKU, UPC, and the like), security code information (e.g., hash codes, keys, etc.) for supporting and providing security in the transfer of the token information, or other types of information that may be a combination of one or more of this data.

For example, mobile device 150 may be configured to obtain token information by scanning, reading, or otherwise collecting token information in the form of a barcode or similar data structure. For example, user 152 may initiate software programming or mobile application installed on mobile device 150 to scan and/or read a barcode that contains payment token information. In one aspect, the barcode may be provided on a product package, on a paper or other material sign, on a page in a magazine, on a letter, or any other type of material that may be available and accessible for obtaining from mobile device 150. In certain aspects, there may be no need or requirement that the mobile device 150 have network communication connectivity with financial service provider 110 or other third party system(s) over, for example, network 140. Connectivity may exist with between mobile device 150 and the payment token information source (e.g., the source providing the payment token information, such as packaging, signage, magazine advertisement, etc.), such as through NFC or similar communications.

In other embodiments, mobile device 150 may obtain payment token (or payment token information) electronically from financial service system 110, or a third party system, via for example a website, SMS messaging, email, or other forms of electronic communications. In such embodiments, there may be available network communication connectivity to establish communications between the mobile device 150 and financial service provider system 110 or the third party system.

In one embodiment, the payment token information may be generated and provided by financial service provider system 110, merchant system 160, or other systems associated with other entities such as advertisers. For example, a barcode including payment token information may be provided by a financial service provider associated with financial service provider system 110. The barcode (or similar coded data) may be in a paper form that could be scanned by mobile device 150, and be presented or mailed to user 152. Alternatively, the barcode may be delivered to mobile device 150 via a secure network provided by a third party service, such as a short message service (SMS).

The barcode (or similar coded data) may be a one-dimensional or two-dimensional barcode containing information of payment tokens usable for mobile payments. The two-dimensional barcode may comprise any suitable types of patterns including rectangles, dots, hexagons, and other geometric patterns in two dimensions. The two-dimensional barcode may also have any suitable dimensions. In some embodiments, the barcode may be a quick response (QR) code that contains information associated with payment tokens. In other embodiments, RFID (radio frequency identification) tags may be used in place of the barcode for delivering information associated with the payment token to mobile device 150.

At step 420, mobile device 150 may obtain information associated with a payment token based on the obtained payment token information. In one embodiment, mobile device 150 may execute software instructions (e.g., mobile payments application 325, or other software) to decode the received payment token information (e.g., barcode) and obtain information associated with a payment token. In one example, mobile device 150 may present user 152 via a display screen one or more interfaces that enable user 152 to view and/or configure the payment token. For example, mobile device 150 may present user 152 with the obtained token information, such as the issuer of the payment token, account number associated with the payment token, value of the payment token, expiration date of the payment token, etc. The payment token may also be associated with one or more stock keeping unit (SKU) numbers, or associated with certain manufactures at certain locations for usage. In some embodiments, the barcode may be encrypted, and software executing on mobile device 150 (e.g., mobile payment application 325) may perform a decryption process to obtain information of the payment token.

Mobile payment application 325 (or other software) may receive user 152's input selections to transfer the payment token to mobile device 150 (step 430). For example, mobile application 325 may receive user 152's input selections to transfer the value stored in the payment token from a giver entity, such as a financial service provider associated with financial service provider system 110, or a merchant associated with merchant system 160, to mobile device 150. Mobile payment application 325 (or other software) may then cause mobile device 150 to store the payment token in memory (e.g., a payment token memory on mobile device 150) for future payments or transfer. For example, mobile payment application 325 (or other software) may perform processes that store the payment token in a memory included in mobile device 150. In some embodiments, mobile payment application 325 (or other software) may perform processes that may store the payment token in one or more data structures that may be used by software instructions that perform mobile payment operations consistent with disclosed embodiments. The disclosed embodiments may enable user 152 to perform types of actions associated with the payment token. For example, mobile payment application 325 may enable user 152 to configure a time for the payment token to be transferred to mobile device 150. Mobile device 150 may be configured to receive input form user 152 via one or more interfaces displayed by mobile device 150 to configure payment tokens. In other embodiments, the payment token may be preconfigured by the entity (and system associated with the entity) that provided the payment token (via payment token information), such as financial service system 110. For instance, mobile payment application 325 may perform processes that generate interface(s) that enable user 152 to configure a partial value of the total value of the payment token to be transferred to mobile device 150.

In step 440, mobile device 150 may communicate with a contactless payment terminal (CPT) to perform a payment transaction using the payment token stored in mobile device 150. For example, user 152 may position mobile device 150 storing the payment token near a contactless payment terminal for payment of a requested financial transaction. Mobile device 150 may communicate the payment token to the contactless payment terminal to perform a purchase transaction. In certain aspects, the CPT (e.g., component of merchant system 160) may obtain the payment token from mobile device 150 over known mobile payment communication mechanisms and may provide the token to an authentication server for authorization (e.g., financial service system 110, a payment network, etc.).

For instance, user 152 may shop at a merchant location and collect products for purchase. One of those products may be associated with a payment token (e.g., payment token information was affixed to a package of the product and obtained by mobile device either at the merchant location or previously (e.g., via a advertisement, etc.)). When checking out at a POS with a CPT, user 152 may present the products to be purchased to a merchant representative. User 152 may present mobile device 150 in communication range of the CPT to transfer the payment token to the POS. In such instances, mobile device 150 may not have network communication connectivity with financial service system 110 or other components over network 140, but has communication connectivity with the CPT and POS over, for example, local network 120. In such an example, merchant system 160 may be configured to accept the received payment token from mobile device 150, process the token to confirm the relationship with the payment token and the associated product to be purchased, credit the purchase in accordance with business logic or similar procedures associated with the payment token, and authorize the purchase transaction during the transaction. In such instances, merchant system 160 may authorize the purchase and allow user 152 to purchase and leave the merchant location with the purchased product without merchant system 160 and/or mobile device 150 having to authorize, confirm, etc. the payment associated with the payment token over network 140 (or similar network). Further examples of a payment transaction process consistent with the disclosed embodiments are disclosed below in connection with FIG. 6.

Figure 5:
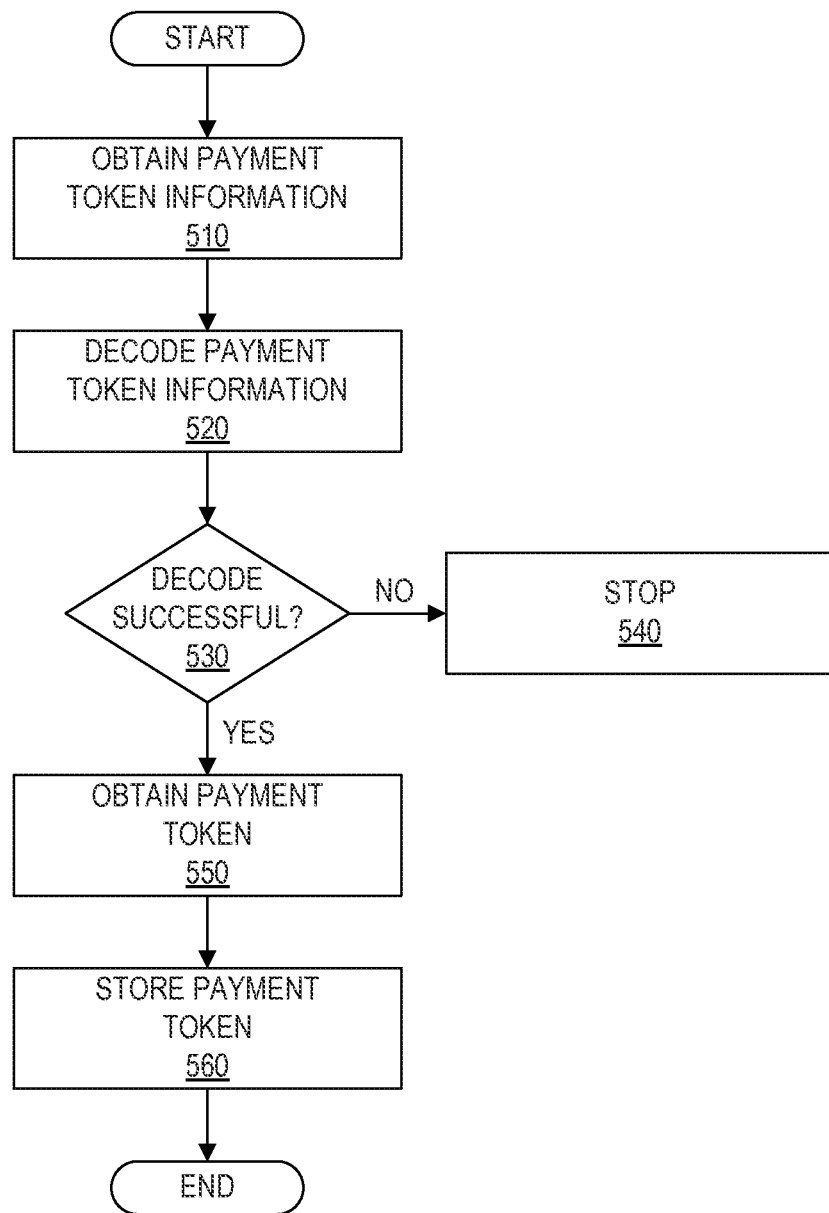
FIG. 5 is a flowchart of an exemplary token delivery process, consistent with disclosed embodiments.

FIG. 5 is a flowchart of an exemplary payment token delivery process consistent with the disclosed embodiments. In one aspect, one or more processes of FIG. 5 may be performed by mobile device 150, such as mobile payment application 325 or other software instructions stored and executed by mobile device 150.

At step 510, mobile device 150 may receive a request from user 152 to obtain a payment token (e.g., in the form of a barcode, etc.). In one example, mobile device 150 may execute software instructions that receive image information from a camera in mobile device 150 that captures an image of a barcode, for example, containing payment token. The operation of scanning or otherwise reading a barcode may be initiated by user 152 using mobile payment application 325. In some embodiments, the barcode may be manually entered by user 152 or be combined with a manually entered passcode by user 152. For example, user 152 may scan a barcode containing information related to a payment token, and enter a passcode which is to be combined with a device identifier, to form a payment token that can be used to complete a purchase. In one embodiment, mobile payment application 325 may require user to present credentials to enable access to the functionalities of the application, such as a username and password. The barcode may contain information related to a payment token.

At step 520, mobile device 150 may decode the received payment token. In some embodiments, user 152 may initiate mobile application 325 installed on mobile device 150 to perform the decoding operation. In other embodiments, mobile device 150 may be configured to automatically decode the obtained payment token once received by mobile device 150 (or at some point later).

In certain aspects, the barcode (or other code hosting the payment token information) may be encrypted so that only a certain mobile device is able to decrypt the barcode for obtaining the payment token. For example, the barcode may be encrypted with an identifier of mobile device 150, and as a result, if other mobile devices attempt to decode the barcode, the decoding process may not be successful. In one aspect, mobile device 150 may prompt user 152 for an identification input (e.g., password or PIN) for decryption of the barcode. In other embodiments, mobile device 150 may be configured to execute software instructions that perform decoding processes for decoding codes including payment tokens based on standardized formatting information. For example, mobile device 150 may store and execute software instructions (e.g., mobile applications 325) that is configured to detect, recognize, and process payment tokens from barcodes or similar codes based on predetermined barcode (or similar codes) and/or payment token format standards.

At step 530, mobile device 150 may determine whether the decoding of the barcode (or similar code) is successful. If the decoding is unsuccessful (step 530; No), mobile device 150 may not continue the token delivery process at step 540. On the other hand, if the decoding of the barcode is successful (step 530; Yes), mobile device 150 may proceed to obtain the payment token from the successfully decoded payment token information at step 550. For example, mobile device 150 may identify information of the payment token by decoding a barcode. The information identified may include a value of the payment token, an account number associated with the payment token, expiration data associated with the payment token, a particular product associated with the payment token, a refresh rate for the payment token etc. In some embodiments, mobile device 150 may request input from user 152 on whether the payment token should be retained by mobile device 150. Mobile device 150 may also present an interface to user 152 for selecting the amount of token value to be retained, time and/or date for the payment token to be retained, etc. At step 560, mobile device 150 may store the obtained payment token in a memory for use in future payment transactions or transfer to other components, such as another mobile device.

A payment token consistent with disclosed embodiments may be provided in various formats and be configured in various ways. For example, a payment token may represent a cash value that may be used in place of cash payments that allows a user operating mobile device 150 to perform a mobile payment process at a POS or the like to purchase a product without requiring network connectivity between mobile device 150 and a payment network, financial service provider system 110 or other system associated with an entity that provides financial services for user associated with accounts used by user 152 to purchase. In some embodiments, the payment token may be presented in a form of non-cash value, such as a purchase discount or store credit associated with a merchant. In some embodiments, the payment token may be restricted for payment transactions among certain merchants. The payment token may be restricted for payment transactions for certain products identified by SKU numbers. In addition, the payment token may be restricted for usage at certain time periods and locations to purchase certain products associated with certain merchants.

In certain embodiments, one or more of process steps 510-560 may be performed by mobile applications executed by mobile device 150. As will be apparent to those skilled in the art, each of these steps may also be performed by other software instructions executed by one or more processors in mobile device 150.

Figure 6:
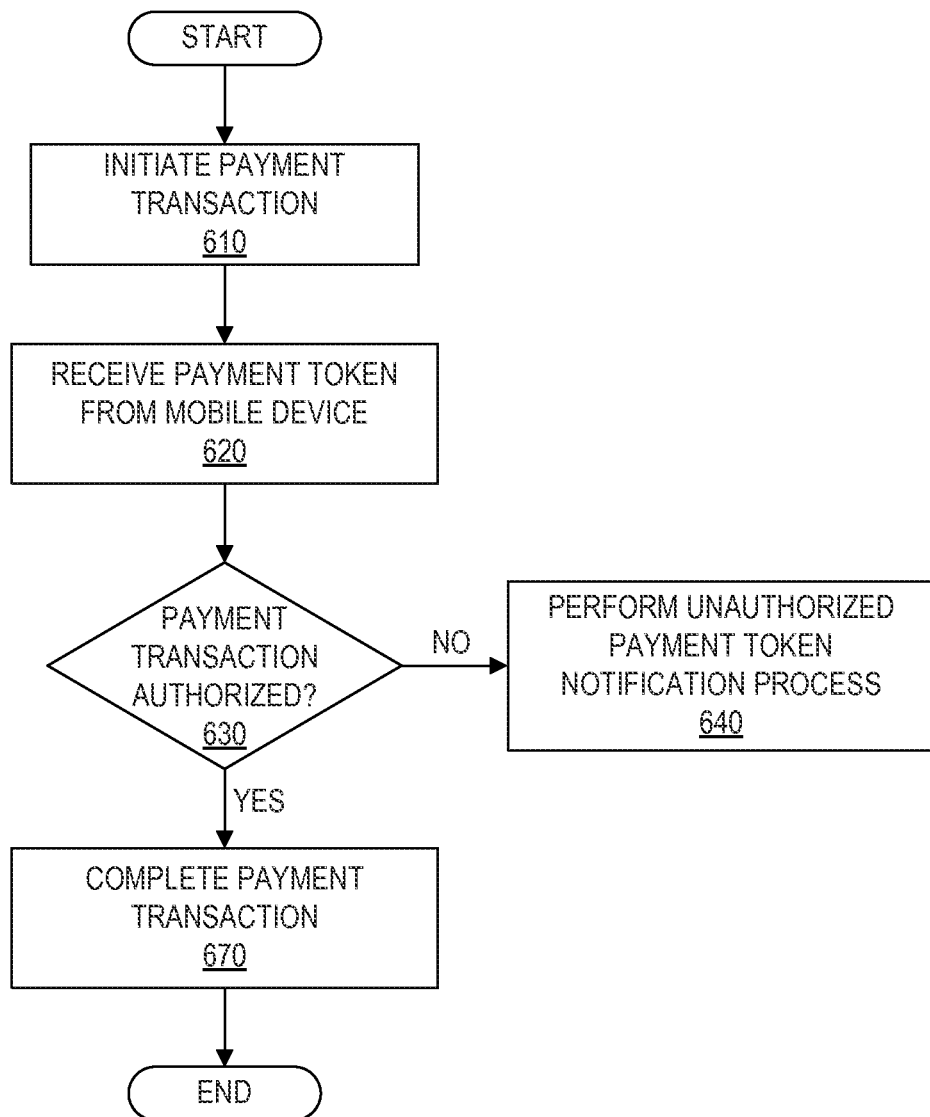
FIG. 6 is a flowchart of an exemplary payment transaction process, consistent with disclosed embodiments.

FIG. 6 is a flowchart of an exemplary payment transaction process consistent with the disclosed embodiments. In one aspect, payment transaction process 600 may be performed by merchant system 160 to enable payment transactions made by mobile device 150 using payment tokens. At step 610, merchant system 160 may initiate a payment transaction with mobile device 150. For example, merchant system 160 (e.g., a POS, etc.) may take part of a purchase transaction associated with user 152 that attempts to purchase one or more products at a merchant location (e.g., checkout at a store, etc.). During the purchase transaction session, user 152 may launch mobile payment application 325 (or other software) on mobile device 150 to perform token payment processes consistent with disclosed embodiments. Mobile device 150 may provide an interface on a display that lists one or more payment tokens stored on mobile device 150 (e.g., payment tokens previously obtained and stored by mobile device 150). Mobile device 150 may generate and provide an interface that enables user 152 to identify and select one or more payment tokens for use during the purchase transaction. In one example, mobile device 150 may receive input from user 152 of a selection of a payment token stored in mobile device 150 for use during the payment transaction. In some embodiments, mobile payment application 325 may display the applicable restrictions associated with the payment token. For example, mobile payment application 325 may generate an interface to display a dollar amount associated with the payment token, a daily limit, or previous user-defined restrictions for the payment token.

At step 620, merchant system 160 may receive the payment token from mobile device 150. For example, user 152 may position mobile device 150 near the contactless payment terminal of merchant system 160 to arrange for payment of one or more products with the payment token. For instance, mobile device 150 may communicate the payment token to merchant system 160 by short range wireless communication mechanism, such as NFC, Bluetooth™ communication mechanism, or the like (e.g., over local network 120). Information communicated between merchant system 160 and mobile device 150 may include, but is not limited to, the payment token, a financial service account number that may be used to purchase one or more products (which may or may not be associated with the payment token) and may be used to perform mobile payments for purchases not associated with the payment token, discounts or rebates associated with the payment token, authorization identifier associated with the payment token (if any), or the like.

At step 630, merchant system 160 may determine whether the payment transaction is authorized based on received information from mobile device 150. For example, merchant system 160 may communicate information of the payment token with financial service provider system 110 to seek authorization of the transaction. For another example, merchant system 160 may be configured to execute software instructions that determine whether an account associated with the payment token is valid, and if so, authorize the transaction. Merchant system 160 may be configured to determine authorization without initiating any communication with financial service provider system 110. For example, merchant system 160 may be configured to process and recognize payment tokens to determine whether the received token is linked to a product that user 152 is attempting to purchase. As an example, mobile device 150 may obtain and store a payment token that is associated with a particular product (e.g., linked to a UPC, SKU, etc.). During the purchase transaction session, merchant system 160 may process the received payment token and compare the product information included in the token that links the token to the particular product, with SKU information obtained when merchant system 160 receives the SKU information when checking out the product (e.g., scans the UPC of a product during check out). If the product information for a product for purchase matches the product information associated with the received payment token, merchant system 160 may authorize the purchase of the product. In other examples where the payment token may be in the form of general store credit, purchase discount, or the like, merchant system 160 may perform processes that determines whether the token is a valid payment token. For instance, merchant system 160 may determine whether the payment token is configured such that it is linked to a particular user or mobile device (e.g., user 152 and/or mobile device 150). Merchant system 160 may use user identifier information obtained from mobile payment information obtained from mobile device 150 (e.g., account information, mobile device identifier data, etc.) to compare with the payment token data. In other embodiments, merchant system 160 may check the payment token to determine whether it has expired, or is not linked to the merchant location, or any other restrictions associated with the payment token that may be configured in the token. If the payment token characteristics are confirmed as valid, merchant system 160 may authorize the purchase transaction using the payment token parameters (e.g., credit the amount associated with the payment token, etc.).

For example, merchant system 160 may determine whether the product for purchase satisfies one or more restrictions associated with the payment token. Merchant system 160 may also determine any other restrictions associated the payment token are satisfied with the transaction. For example, if there is an expiration date associated with the payment token, merchant system 160 may check whether the token expired before completing the payment transaction. As another example, if the payment token is configured for use in certain locations, merchant system 160 may check the location of the point of sale terminal to determine whether the location restriction is satisfied. In some embodiments, the total number of transactions to be made with the payment token may be limited. In these circumstances, merchant system 160 may check the number of transactions made by the payment token in the account history and determine whether the limitation has been reached.

If restrictions associated with the payment token are satisfied, merchant system 160 may perform known payment processes with mobile device 150 and complete the payment transaction at step 670. In one embodiment, mobile device 150 may prompt user 152 to manually enter one or more transaction details, such as the payment amount and the destination, using known input mechanisms for mobile device 150 (e.g., touch screen, keypad, voice recognition technology, etc.). In another embodiment, mobile device 150 may execute software that generates communications that may be provided to merchant system 160 to request and receive one or more transaction details, such as the payment amount and the destination. Mobile device 150 may also prompt user 152 to confirm the transaction details before allowing mobile device 150 to complete the payment.

If the payment transaction is not authorized (step 630; No), merchant system 160 may provide an unauthorized payment token notification process (step 640). For example, merchant system 160 may generate an notification (e.g., display, audible alert, etc.) that reflects that an unauthorized payment token is in use, to allow merchant system 160 or a representative of the merchant location to perform subsequent processes for handling the purchase transaction.

In some embodiments, financial service system 110 may settle up with merchant system 160 for a payment transaction associated with the payment token after user 152 has left the merchant location (or during the payment transaction). For example, user 152 may purchase a product with a payment token at a merchant location, and the POS terminal at the merchant location may authorize the sale at the location. After user 152 leaves the merchant location, merchant system 160 may provide the payment token to financial service system 110 to settle up and obtain the funds required for the purchase.

In some embodiments, financial service system 110 may generate payment tokens based on one or more financial accounts of user 152. Financial service system 110 may store payment token parameters (e.g., restrictions, characteristics, refresh rates, conditions etc.) in a memory, where the payment token parameters may be linked to user 152 or multiple users, linked to mobile device(s), etc. This information may be accessible and used by financial service system 110 to confirm and authenticate or otherwise authorize the use of the payment token. In certain aspects, business logic may be stored at financial service system 110 to receive a request from merchant system 160 associated with the payment token to authorize its use. The request may be received after user 152 leaves the merchant location or during the purchase transaction.

In certain aspects, payment tokens may expire. For example, the payment token may expire six months after it is issued. The disclosed embodiments may be configured to automatically refresh a possibly expired payment token when network connectivity is later established between mobile device 150 and financial service system 110 (or source of payment token). Token refreshment may include updating an expiration date associated with the payment token. For example, mobile device 150 may execute software to send a request to financial service system 110 to refresh the payment token and receive a response from financial service system 110 with a refreshed payment token. On the other hand, financial service system 110 may be configured to receive a request from mobile device 150 to refresh the payment token. In response, financial service system 110 may be configured to update the token information stored in financial service system 110 and send the refreshed token to mobile device 150. In some embodiments, financial service system 110 may be configured to automatically refresh the payment token and send a refreshed payment token without receiving a request from mobile device 150. For example, financial service system 110 may be configured to automatically refresh the payment token on a periodical basis when network connectivity is available between mobile device 150 and financial service system 110.

In some embodiments, the business logic associated with the payment token may be stored in merchant system 160 that enables merchant system 160 to perform transactions associated with payment token locally. For example, the business logic may be received from financial service system 110 or otherwise.

The exemplary disclosed embodiments describe systems and methods for delivering payment tokens to mobile devices and conducting payment transactions using the payment tokens. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A computer-implemented method for delivering payment tokens, comprising:
    establishing, by one or more processors of a mobile device, a connection with a financial service provider system over a first network when connectivity to the first network is available to the mobile device, the financial service provider system being associated with a financial service provider that provides a financial service account to a user of the mobile device;
    receiving, by the one or more processors, image information from a camera in the mobile device that captures an image of a code containing encrypted payment information related to a payment token, wherein the payment information is encrypted with a device identifier of the mobile device;
    receiving, by the one or more processors, identification input from the user, the identification input being utilized to decrypt the payment information;
    obtaining, by the one or more processors, the payment token from the decrypted payment information, wherein the payment token is restricted for payment transactions associated with an identifier of at least one predetermined product to be purchased;
    storing, by the one or more processors, the payment token in a memory;
    transferring, by the one or more processors, the payment token to a contactless payment terminal (CPT) associated with a merchant during a purchase transaction to purchase a product by communicating the payment token to the CPT over a local network different from the first network for authorization, such that the transfer is completed without network connectivity with the first network; and
    receiving, by the one or more processors, an indication, from the CPT, of whether the payment token is authentic based at least on a matching of a product identifier of the product to be purchased with the identifier of the at least one predetermined product associated with the payment token, wherein the CPT is configured to request authorization of the payment token, from an authorization server, by providing the payment token and the product identifier of the product being purchased to the authentication server.

2. The method of claim 1, wherein the identification input includes credentials that enable access to functionalities of a mobile payment application.

3. The method of claim 2, wherein the credentials include a passcode.

4. The method of claim 1, wherein the code is a Quick Response (QR) Code.

5. The method of claim 1, further comprising:
    identifying from the decrypted payment information, by the one or more processors, a payment account number of the financial service account associated with the payment token.

6. The method of claim 1, wherein the decrypted payment information includes at least one of: a value of the payment token, expiration data associated with the payment token, the identifier of the at least one predetermined product associated with the payment token or a refresh rate for the payment token.

7. The method of claim 1, wherein the identifier of the at least one predetermined product is an SKU number.

8. The method of claim 1, further comprising:
    presenting, by the one or more processors, an interface configured to allow selection of an amount of payment token value to be retained.

9. The method of claim 1, wherein the payment token is associated with a payment token parameter and a stock keeping number.

10. A mobile device, the mobile device comprising:
    one or more processors; and
    a memory storing instructions that, when executed by the one or more processors, cause the one or more processors to perform operations comprising:
        establishing a connection with a financial service provider system over a first network when connectivity to the first network is available to the mobile device, the financial service provider system being associated with a financial service provider that provides a financial service account to a user of the mobile device;
        receiving image information from a camera in the mobile device that captures an image of a code containing encrypted payment information related to a payment token, wherein the payment information is encrypted with a device identifier of the mobile device;
        receiving identification input from the user, the identification input being utilized to decrypt the code to obtain payment information;
        obtaining the payment token from the decrypted payment information, wherein the payment token is restricted for payment transactions associated with an identifier of at least one predetermined product to be purchased;
        storing the payment token in the memory;
        transferring the payment token to a contactless payment terminal (CPT) associated with a merchant during a purchase transaction to purchase a product by communicating the payment token to the CPT over a local network different from the first network for authorization, such that the transfer is completed without network connectivity with the first network; and
        receiving an indication, from the CPT, of whether the payment token is authentic based at least on a matching of a product identifier of the product to be purchased with the identifier of the at least one predetermined product associated with the payment token, wherein the CPT is configured to request authorization of the payment token, from an authorization server, by providing the payment token, and the product identifier of the product being purchased to the authentication server.

11. The mobile device of claim 10, wherein the identification input includes credentials that enable access to functionalities of a mobile payment application.

12. The mobile device of claim 11, wherein the credentials include a passcode.

13. The mobile device of claim 10, wherein the code is a Quick Response (QR) Code.

14. The mobile device of claim 10, further comprising:
identifying from the decrypted payment information, by the one or more processors, a payment account number of the financial service account associated with the payment token.

15. The mobile device of claim 10, wherein the decrypted payment information includes at least one of: a value of the payment token, expiration data associated with the payment token, the identifier of the at least one predetermined product associated with the payment token, or a refresh rate for the payment token.

16. The mobile device of claim 10, wherein the identifier of the at least one predetermined product is an SKU number.

17. The mobile device of claim 10, wherein the operations further comprise:
presenting, by the one or more processors, an interface configured to allow selection of an amount of payment token value to be retained.

18. The mobile device of claim 10, wherein the payment token is associated with a payment token parameter and a stock keeping number.

\* \* \* \* \*